United States Patent Office 2,811,511
Patented Oct. 29, 1957

2,811,511

POLYMER FROM ALPHA-HYDROXY ISOBUTYRIC ACID

Thomas Alderson, North Hills, near Wilmington, Del., assignor to E. I. du Pont de Nemours and Company, Wilmington, Del., a corporation of Delaware No Drawing. Application November 12, 1953, Serial No. 391,715

11 Claims. (Cl. 260—78.3)

This invention relates to high molecular weight polyesters and more particularly to high molecular weight polyesters of α-hydroxyisobutyric acid and a process for the preparation of the same.

High molecular weight polyesters obtained from the reaction of aromatic dibasic acids with aliphatic glycols are of considerable importance for the preparation of films and fibers. However, polyesters derived from aliphatic hydroxy acids, e. g., α-hydroxyisobutyric acid have not attained any importance. In the case of α-hydroxyisobutyric acid this has probably been due to the fact that conventional esterification techniques fail to polymerize this hydroxyacid. Blaise et al. have reported, Compt. rend. 174, 1553 (1922), an interesting and unusual type of hydroxyacid derivative. In the method of Blaise et al. the hydroxyacid was converted to the anhydrosulfite by reaction with thionyl chloride. The anhydrosulfite was decomposed by heat at 121–125° C. in the absence of solvent to give a product unstable to alkali as shown by the fact that the α-hydroxy acid was regenerated upon treatment with alkali. Repetition of the Blaise et al. procedure confirmed this, the polymer obtained by following his procedure being found to be unstable to alkali, of low molecular weight, and not orientable—properties such that little, if any, utility of the polymer could be envisaged in fiber and film applications. This is particularly so in view of the low strength and inability to withstand alkali which fabrics are subject to in soaping or other alkaline treatments.

This invention has as an object the preparation of high molecular weight, alkali stable and orientable α-hydroxyisobutyric acid homopolymers and the process for their preparation wherein the anhydrosulfite of α-hydroxyisobutyric acid is heated at a temperature in the range from 60 to 150° C. in the presence of an aromatic hydrocarbon or halogenated hydrocarbon under substantially anhydrous conditions until a major amount of monomer is converted to polymer. The polymer produced by the process of this invention has an inherent viscosity of at least 0.7 (corresponding to a molecular weight of at least 50,000 and a degree of polymerization, D. P., of at least 580) and upon boiling in 3 N alkali for five hours is not hydrolyzed to monomer to an extent greater than 6%. The anhydrosulfite employed should be pure. The anhydrosulfite having a refractive index between 1.4260 and 1.4320 yields acceptable polymers while even higher molecular weight polymers are obtained when the refractive index is between 1.4290 and 1.4310. The anhydrosulfite employed is obtained when α-hydroxyisobutyric acid is reacted with thionyl chloride at temperatures less than 30° C. and preferably 0–10° C.

In general, the products of this invention are obtained by the heating of the anhydrosulfite of isobutyric acid

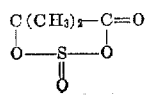

in a solvent which is an aromatic hydrocarbon, e. g., benzene, or halogenated aromatic hydrocarbon, e. g., chlorobenzene, at 60–150° C. for a period of time of generally 3 to 50 hours, or longer, followed by separation by removal of volatiles by distillation or by precipitation of the polymer by pouring the product into a liquid which is a non-solvent for the polymer but dissolves the monomer and added solvents and drying of the polymer. The polymer obtained has the repeating unit

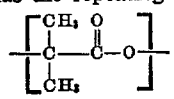

The following examples in which parts are by weight are illustrative of the invention.

EXAMPLE I

A. Preparation of anhydrosulfite

A reaction vessel equipped with a reflux condenser vented through a drying apparatus and a capillary tube through which dry nitrogen could be passed into the reaction mixture was charged with 104 parts of α-hydroxyisobutyric acid and 149 parts of thionyl chloride. The reaction vessel was placed in a cooling bath at 10° C. for 20 hours. The excess thionyl chloride was then distilled through a short still head at reduced pressure, after which 77.7 parts (52% yield) of the anhydrosulfite of α-hydroxyisobutyric acid was distilled, B. P. 53–55° C./16 mm. This product was fractionally distilled twice through a precision fractionating column. This anhydrosulfite varied in $n_D^{25} = 1.4246$ to $1.4312$. Fractions within this range were separated and characterized on the basis of their refractive index.

B. Polymerization of anhydrosulfite

A tubular glass vessel was dried by heating at 110–150° C. for at least three hours and was charged with 24 parts of benzene. About eight parts of benzene was distilled to remove possible traces of moisture from the benzene and the vessel. The vessel was vented through a drying tube. The benzene was frozen and 9.6 parts of the anhydrosulfite having a $n_D^{25}$ of 1.4279 was added. The reaction mixture was blanketed with nitrogen and heated at 80° C. for 52 hours. A cloudy, colorless gel was removed from the vessel. This was washed with benzene and dried in a vacuum oven at 60° C. for 18 hours. There was obtained 4.905 parts of white, granular solid which had a stick temperature of 165–170° C., a molecular weight of about 108,000 and a degree of polymerization of about 1255. It melted at from 206 to 240° C. and its $\eta_{\text{Ihn.}} = 1.47$ (inherent viscosity at 0.5% concentration in a 58.8/41.2 phenol/2,4,6-trichlorophenol, i. e., 10 parts phenol to 7 parts trichlorophenol mixture). It was orientable and was stable to alkali as shown by loss of less than 6%, by weight, on refluxing with 3 N aqueous sodium hydroxide for five hours.

EXAMPLE II

Following the procedure outlined in Example I, 12 parts of the anhydrosulfite was heated in benzene solution at 80° C. for 235 hours. From this reaction there was obtained 4.687 parts of polymer which had a stick temperature of 168° C., melted at 190–240° C. and had an inherent viscosity of 1.13. The polymer was oriented by stretching of films and fibers. The polymer was stable to alkali, had a molecular weight of about 81,000 and a degree of polymerization of about 940.

EXAMPLE III

A. Preparation of anhydrosulfite

A reaction vessel was charged with 1000 parts of thionyl chloride. The reaction vessel was attached to a reflux condenser vented through a drying tube and was immersed in ice/salt bath for one hour to cool the thionyl chloride. To this was added 312 parts of α-hydroxyisobutyric acid. The reaction system was then attached to a water pump to remove hydrogen chloride. The reaction system was allowed to stand at 0° C./110–200 mm. for 18 hours and was then warmed to room temperature at this pressure. The excess thionyl chloride was distilled rapidly through a short still head at reduced pressure and 309 parts of anhydrosulfite (69% yield) was then distilled, B. P. 41–48° C./8 mm. This product was fractionally distilled through a precision column. The distillate had $n_D^{25}=$ 1.4290–1.4309. From analysis, this anhydrosulfite was substantially pure.

B. *Polymerization of anhydrosulfite*

A solution was made by distilling 111 parts of the anhydrosulfite of α-hydroxyisobutyric acid of part A having $n_D^{25}=1.4300$ directly into 182.5 parts of frozen benzene (which had been dried by topping), and the solution was refluxed for 70 hours. The reaction mixture was poured into 960 parts of methanol and white, granular polymer precipitated. This polymer was filtered and dried in a vacuum oven for 40 hours at 40° C. There was obtained 58.5 parts of white, granular, alkali stable solid which had a stick temperature of 149° C. It melted from 180–226° C. and its inherent viscosity was 0.95. Its molecular weight was about 69,000 and its degree of polymerization about 800.

EXAMPLE IV

When the general procedure of Example III was repeated except that 66 parts of α-hydroxyisobutyric acid anhydrosulfite of $n_D^{25}=1.4296$ and 240 parts of benzene was refluxed for 43 hours, a total of 39 parts of polymer was obtained which had an inherent viscosity of 0.94, a molecular weight of about 68,000 and a degree of polymerization of about 790.

EXAMPLE V

When the general procedure of Example III was repeated except that 36 parts of α-hydroxyisobutyric acid anhydrosulfite of $n_D^{25}=1.4289$ was refluxed for 92 hours, 20.9 parts of polymer was obtained. The polymer had a stick temperature of 154° C. and melted from 190–245° C. Its inherent viscosity was 0.98, its molecular weight was about 71,000 and its degree of polymerization was about 825.

EXAMPLE VI

A total of 49.2 parts of anhydrosulfite of α-hydroxyisobutyric acid (Example III-A) of $n_D^{25}=1.4293$ was distilled into 275 parts of frozen chlorobenzene. The reaction mixture was refluxed (121° C.) for 7.5 hours. A marked increase in viscosity was observed when the reaction had been refluxed for 30 minutes. The polymer solution was poured into 800 parts of methanol and there was thus obtained a white polymer which had a stick temperature of 155° C. and melted from 188 to 223° C. Its inherent viscosity was 1.30. Its molecular weight was about 93,000 and its degree of polymerization was about 1080.

EXAMPLE VII

Following the procedure of Example VI, 50 parts of α-hydroxyisobutyric acid anhydrosulfite of $n_D^{25}=1.4296$ was refluxed for two hours and 20 minutes with 250 parts of chlorobenzene. The reaction mixture was allowed to cool to 105° C. and a 30–40 part sample was removed while the reaction mixture was blanketed with dry nitrogen. From this sample 3.55 parts of polymer was precipitated by adding the solution to methanol. This material had a stick temperature of 158° C. It melted from 200–250° C. and its inherent viscosity was 1.03. To the remainder of the polmerization reaction mixture there was then added 12 parts of anhydrosulfite and the reaction mixture was refluxed for an additional five hours. From this reaction there was obtained by the methanol-precipitation technique 39.3 parts of polymer which had a stick temperature of 153° C. It melted from 195–240° C. and its inherent viscosity was 1.06. Its molecular weight and degree of polymerization were about 78,000 and 910, respectively.

When samples of the polymeric products of the preceding examples were subject to refluxing 3 normal aqueous sodium hydroxide for five hours, at least 94% of the original polymer was recovered, i. e., saponification corresponded to less than 6% by weight.

In contrast to the polymers of the above examples, the polymer prepared in the absence of solvent by the procedure of Blaise et al. had an inherent viscosity of 0.31 and melted over the range 181 to 208° C. The use of a trace of α-hydroxyisobutyric acid to catalyze the polymerization did not change the properties or increase the yield. The polymer could not be oriented by stretching. It was soluble within a few minutes in boiling 3 N alkali.

The anhydrosulfite of α-hydroxyisobutyric acid employed to produce the stable polymer of this invention should have a high purity. The anhydrosulfite is preferably obtained by reaction of excess thionyl chloride with α-hydoxyisobutyric acid at a temperature of 0–30° C. but may be prepared at temperatures from −30° C. to +30° C. The anhydrosulfite is purified by fractional distillation under reduced pressure, preferably below 75° C. and best at 45–60° C., boiling at 53–55° C. at 16 mm. Highly purified anhydrosulfite of α-hydroxyisobutyric acid has a value of $n_D^{25}$ of 1.4294–1.4298. The refractive index is a good criterion of purity and, although the above range is preferred for the preparation of high molecular weight polymers of exceptionally good stability to hydrolysis, polymers are obtained which possess these characteristics though to a slightly less degree when the range of $n_D^{25}$ varies from 1.4260 to 1.4320.

The critical feature in the process of this invention is in the use of a solvent. The preparation of high molecular weight and alkali-stable α-hydroxyisobutyric acid polymer requires the use of a suitable solvent for the polymer formation from the anhydrosulfite. The solvent must be anhydrous since the polymerization is effected only under substantially anhydrous conditions. The solvent should be free from active hydrogen as in alcoholic or acidic groups.

The character of the solvent is the key to the preparation of high molecular weight polymer. Polymers obtained in aliphatic hydrocarbons such as n-octane, ethers such as diethyl ether, and cyclic ethers such as dioxane, had low viscosities, i. e., inherent viscosities of from 0.24 to 0.35. Such polymers are of low molecular weight and are not orientable nor are they resistant to alkali. These polymers have the same order of viscosity with lack of orientability and susceptibility to strong soaps and alkali as polymers prepared by heating the anhydrosulfite in the absence of added solvent. While polymers obtained using chlorinated aliphatic hydrocarbons such as tetrachloroethylene as the solvent are outstandingly different from the polymers hitherto obtained, having inherent viscosities up to 0.6 and a stability towards refluxing 3 N aqueous alkali somewhat less than that of the polymers of the present invention, they by no means have the high molecular weight, inherent viscosity and degree of polymerization characteristic of polymers, obtained with aromatic solvents, of the present invention.

The solvents useful for the polymerization of the orientable and alkali resistant polymers of this invention include the monocyclic aromatic hydrocarbons and halogenated hydrocarbons. Any aromatic hydrocarbon or halogenated aromatic hydrocarbon, free from non-aromatic unsaturation, monocyclic, and liquid at the polymerization temperature can be employed. Particularly useful are benzene and substituted benzenes having up to 3 alkyl groups of a total of up to 3 carbons, i. e., hydrocarbons of up to 9 carbons having a benzene nucleus and $n$ alkyl groups, $n$ being a cardinal number no greater than 3, and halogenated aromatic hydrocarbons of less than 60% halogen content and particularly those having one or two chlorines on nuclear carbon. Thus there can be employed benzene, toluene, xylene, mesitylene, ethylbenzene, bromobenzene and the mono- and di-chlorobenzenes. The halogenated aromatic hydrocarbons include mono- and di-chlorobenzene and bromobenzene. Of the halogenated aromatics, those having 1–2 chlorines on the nuclear or ring carbons are preferred. Normally liquid solvents are preferred, i. e., solvents liquid at 25° C.

The amount of solvent employed in the polymerization is generally within the range of from 0.5 to 20 times as much as the weight of the anhydrosulfite. Optimum properties of the polymer are obtained when the solvent is present in an amount from 2 to about 10 times the amount of anhydrosulfite.

The temperature of the polymerization reaction is generally maintained at 60–150° C. Convenient temperatures are the temperature of reflux of the aromatic solvent, the preferable temperatures being from 75–125° C.

The use of initiators, e. g., carboxylic acids, alcohols, water, tertiary amines, to promote the polymerization does not appreciably enhance the molecular weight of the polyester.

The time of reaction is dependent upon the temperature employed. Although times of the order of two hours to ten days have been employed, in general times of 40–50 hours at 80° C. or 6–10 hours at 130° C. give maximum conversions to high molecular weight polymer.

The formation of polymer from the anhydrosulfite proceeds by the removal of sulfur dioxide. In the polymerization, a means should be provided to vent the sulfur dioxide without permitting access of moisture to the reaction mixture.

During the polymerization, the viscosity of the solution generally increases although polymer may precipitate or form a gel with the aromatic solvent. The polymer is generally purified by its precipitation, e. g., by the addition of a liquid non-solvent for the polymer which is miscible with the aromatic compound, e. g., an alkanol of 1–2 carbons. The polymer can optionally be obtained by removal of any volatiles, e. g., aromatic solvent, by distillation.

The polymers of this invention are orientable, and have an inherent viscosity as measured at 0.5% concentration in 58.8/41.2 phenol/2,4,6-trichlorophenol, i. e., 10 parts phenol to 7 parts trichlorophenol solution of at least 0.7 and generally 0.8 to 1.5 (molecular weight of about 50,000 to 100,000). These polymers are resistant to alkali, in fact they are decomposed to an extent of not more than 6% (on a weight basis) upon refluxing in 3 normal sodium hydroxide for five hours. Such alkali stability is outstanding. Whereas, polymers obtained by the methods heretofore described had insufficient alkali resistance to permit use of hot soap solutions without degradation, the products of this invention are substantially inert under such conditions. The polymeric products obtained by heating the anhydrosulfite alone are completely saponified upon boiling with 3 normal sodium hydroxide for times of about 10 hours.

Fibers, films and bars of polymers of $\alpha$-hydroxyisobutyric acid of this invention are clear and colorless when amorphous but become white and opaque when crystallized by annealing or by treatment with solvents. The most useful polymers have been in the molecular weight range of 50,000–100,000 ($\eta_{inh.}=0.7$–1.5). These molecular weights have been established from light-scattering data, osmotic pressure determinations, and by extrapolation of titration data obtained on polymers in the molecular weight range 11,800 ($\eta_{inh.}=0.18$). The crystalline melting point of the polymer has been determined by X-ray methods to be 190° C. The amorphous transition temperature lies between 55 and 60° C. as determined from vibrational data. The amorphous polymer has a density of 1.133 while the density of the crystalline material varies from 1.20–1.23. The presence of orientation in drawn fibers and films has been established by X-ray data and the existence of at least two crystalline forms of the polymer has been established by both X-ray and infrared techniques.

The polymer is soluble in m-cresol, warm trichloroacetic acid, 58.8/41.2 phenol/2,4,6-trichlorophenol, i. e. 10 parts phenol to 7 parts trichlorophenol and chlorobenzene. It is also soluble at 100° C. in dioxane, cyclohexanone, tetramethylene sulfone and at 65° C. in tetrahydrofuran. The polymer exhibits good thermal stability to almost 200° C. The dielectric constant of amorphous films of the polymer is 2.93, the power factor is 0.0150 and the D. C. volume resistivity (ohms) is greater than $4.6 \times 10^{15}$. These properties make the polymer useful for electrical applications. Fibers have been prepared from the polymer of $\alpha$-hydroxyisobutyric acid both by melt spinning at about 210° C. and by dry spinning from chlorobenzene solution at 114° C. Other solvents for the polyester can be used for dry spinning. These fibers when drawn 3.5–4.2 times have shown tenacities of up to 2 grams per denier and elongations of up to 44%. The work recovery exhibited by drawn fibers at 3% elongation has been as high as 53%. Drawn films are clear, colorless, tough, flexible and have good tear resistance. Films have been obtained by pressures of 1000–2000 lbs./sq. in. at 200° C. They have been oriented by drawing 4–6 times in one direction or 2 times in two directions. A film of 4 mil thickness had a tensile strength of 6256 lbs./sq. in. at an elongation of 2.57%. The modulus was 336,739 lbs./sq. in. and toughness (Charpy impact) was 1.5 lbs./sq. in. The tear strength was 5.15 g. The film did not degrade (no decrease in molecular weight) when heated at 100° C. for 500 hours under light of high intensity (Fade-Ometer).

The foregoing detailed description has been given for clearness of understanding only and no unnecessary limitations are to be understood therefrom. The invention is not limited to the exact details shown and described for obvious modifications will occur to those skilled in the art.

What is claimed is:

1. $\alpha$-Hydroxyisobutyric acid homopolymer of inherent viscosity of at least 0.7 measured at 0.5% concentration in a solution of 10 parts phenol to 7 parts trichlorophenol mixture, stable to alkali and orientable.

2. A fiber composed of an $\alpha$-hydroxyisobutyric acid self polyester of inherent viscosity of at least 0.7 measured at 0.5% concentration in a solution of 10 parts phenol to 7 parts trichlorophenol mixture which self polyester loses not more than 6% of its weight on boiling with 3 normal aqueous sodium hydroxide for five hours.

3. An oriented fiber of an $\alpha$-hydroxyisobutyric acid self polyester of inherent viscosity of at least 0.7 measured at 0.5% concentration in a solution of 10 parts phenol to 7 parts trichlorophenol mixture which self polyester loses not more than 6% of its weight on boiling with 3 normal aqueous sodium hydroxide for five hours.

4. A film composed of an $\alpha$-hydroxyisobutyric acid self polyester of inherent viscosity of at least 0.7 measured at 0.5% concentration in a solution of 10 parts phenol to 7 parts trichlorophenol mixture which self polyester loses not more than 6% of its weight on boiling with 3 normal aqueous sodium hydroxide for five hours.

5. An oriented film of an $\alpha$-hydroxyisobutyric acid self polyester of inherent viscosity of at least 0.7 measured at 0.5% concentration in a solution of 10 parts phenol to 7 parts trichlorophenol mixture which self polyester loses not more than 6% of its weight on boiling with 3 normal aqueous sodium hydroxide for five hours.

6. Process for the preparation of orientable, alkali stable, $\alpha$-hydroxyisobutyric acid homopolymer of inherent viscosity of at least 0.7 measured at 0.5% concentration in a solution of 10 parts phenol to 7 parts trichlorophenol mixture wherein $\alpha$-hydroxyisobutyric acid anhydrosulfite of $n_D^{25}$ of 1.4260 to 1.4320 is polymerized by heating the same at a temperature within the range 60° C. to 150° C. in a substantially anhydrous monocyclic aromatic solvent, liquid at the temperature employed, free from non-aromatic unsaturation and selected from the class consisting of aromatic hydrocarbons and halogenated aromatic hydrocarbons.

7. A process for the preparation of orientable, alkali stable, α-hydroxyisobutyric acid homopolymer of inherent viscosity of at least 0.7 measured at 0.5% concentration in a solution of 10 parts phenol to 7 parts trichlorophenol mixture wherein α-hydroxyisobutyric acid anhydrosulfite of $n_D^{25}$ of 1.4260 to 1.4320 is polymerized by heating the same at a temperature within the range 60° C. to 150° C. in a substantially anhydrous monocyclic aromatic hydrocarbon liquid at the temperature employed and free from non-aromatic unsaturation.

8. Process for the preparation of orientable, alkali stable, α-hydroxyisobutyric acid homopolymer of inherent viscosity of at least 0.7 measured at 0.5% concentration in a solution of 10 parts phenol to 7 parts trichlorophenol mixture wherein α-hydroxyisobutyric acid anhydrosulfite of $n_D^{25}$ of 1.4260 to 1.4320 is polymerized by heating the same at a temperature within the range 60° C. to 150° C. in substantially anhydrous benzene.

9. Process for the preparation of orientable, alkali stable, α-hydroxyisobutyric acid homopolymer of inherent viscosity of at least 0.7 measured at 0.5% concentration in a solution of 10 parts phenol to 7 parts trichlorophenol mixture wherein α-hydroxyisobutyric acid anhydrosulfite of $n_D^{25}$ of 1.4294 to 1.4298 is polymerized by heating the same at a temperature within the range 60° C. to 150° C. in substantially anhydrous benzene.

10. Process for the preparation of orientable, alkali stable, α-hydroxyisobutyric acid homopolymer of inherent viscosity of at least 0.7 measured at 0.5% concentration in a solution of 10 parts phenol to 7 parts trichlorophenol mixture wherein α-hydroxyisobutyric acid anhydrosulfite of $n_D^{25}$ of 1.4260 to 1.4320 is polymerized by heating the same at a temperature within the range 60° C. to 150° C. in substantially anhydrous monochlorobenzene.

11. Process for the preparation of orientable, alkali stable, α-hydroxyisobutyric acid homopolymer of inherent viscosity of at least 0.7 measured at 0.5% concentration in a solution of 10 parts phenol to 7 parts trichlorophenol mixture wherein α-hydroxyisobutyric acid anhydrosulfite of $n_D^{25}$ of 1.4260 to 1.4320 is polymerized by heating the same at a temperature within the range 60° C. to 150° C. for a time within the range from two hours to ten days, longer times being employed with lower temperatures and vice versa, in a substantially anhydrous monocyclic aromatic solvent, liquid at the temperature employed, free from non-aromatic unsaturation and selected from the class consisting of aromatic hydrocarbons and halogenated aromatic hydrocarbons.

References Cited in the file of this patent
UNITED STATES PATENTS 2,534,255     Filachione et al. _____ Dec. 19, 1950

OTHER REFERENCES

Filachione et al.: Ind. and Eng. Chem., March 1944, pp. 223–28.

Blaise et al.: Comptes Rendus 174, 1922.

UNITED STATES PATENT OFFICE
CERTIFICATE OF CORRECTION

Patent No. 2,811,511                                      October 29, 1957

Thomas Alderson

It is hereby certified that error appears in the printed specification of the above numbered patent requiring correction and that the said Letters Patent should read as corrected below.

Column 5, line 5, for "or two" read -- to two --; column 6, line 31, for "1.5" read -- 10.5 --; column 8, line 31, list of references cited, under the heading "OTHER REFERENCES", after "1922" strike out the period and insert instead a comma; line 32, insert -- pp. 1553-55 --.

Signed and sealed this 31st day of December 1957.

(SEAL)
Attest:
KARL H. AXLINE

Attesting Officer

ROBERT C. WATSON
                                                                             Commissioner of Patents